United States Patent

McVoy

[15] 3,686,573

[45] Aug. 22, 1972

[54] NON-DUPLICATION SWITCHING ARRANGEMENT FOR CABLE TELEVISION TRANSMISSION

[72] Inventor: David S. McVoy, Gainesville, Fla.

[73] Assignee: Coaxial Scientific Corporation

[22] Filed: Sept. 18, 1969

[21] Appl. No.: 859,091

[52] U.S. Cl. ......325/395, 178/DIG. 13, 235/61.12 R, 325/308, 325/396

[51] Int. Cl. ........G06k 19/00, H04b 3/00, H04n 5/22

[58] Field of Search ......................325/308, 395, 396; 178/DIG. 13; 235/61.12 R

[56] References Cited

UNITED STATES PATENTS

| | | | |
|---|---|---|---|
| 3,366,731 | 1/1968 | Wallerstein | 178/DIG. 13 |
| 3,114,036 | 12/1963 | Andregg | 235/61.12 |
| 3,023,399 | 2/1962 | Dickinson | 340/149 |
| 2,501,274 | 3/1950 | Hamilton | 325/395 |
| 2,272,545 | 2/1942 | Chalupowski | 325/396 |
| 2,488,207 | 11/1949 | Lea | 325/395 |
| 2,501,472 | 3/1950 | Lolli | 325/396 |
| 2,944,245 | 7/1960 | Lynnworth | 325/395 |
| 3,569,839 | 3/1971 | Dyer | 325/396 |

*Primary Examiner*—Howard W. Britton
*Attorney*—Spector and Alster

[57] ABSTRACT

A non-duplication switching arrangement for a cable television system comprises cards that are provided with computer-formed punch holes to correspond to the time periods when the same programs are to be presented on different channels. The cards are mounted in carriers which are loaded into a holder. The carriers with the cards are withdrawn successively from the holder and pass through a photoelectric readout arrangement which detects the presence of the holes and operates relays at the headend equipment to delete the particular channel from transmission over the cable during the time periods at which the holes are detected.

5 Claims, 9 Drawing Figures

INVENTOR
DAVID S. McVOY
by: Spector & Alster
ATTYS.

NON-DUPLICATION SWITCHING ARRANGEMENT FOR CABLE TELEVISION TRANSMISSION

This invention relates to a switching arrangement for multi-channel radio frequency communications systems, particularly cable television systems, for the purpose of preventing transmission of the same program over more than one channel.

In accordance with regulations of the Federal Communications Commission, cable television operators are required to provide so-called non-duplication protection for local television stations. This means that upon request of the local station, the CATV operator cannot duplicate, as by concurrent reception from a remote station and transmission via the cable over another channel, a program that is being broadcast locally. Accordingly, the CATV operator must provide a suitable arrangement at the head-end equipment for non-duplication protection throughout the broadcasting day of local stations.

It is an object of this invention to provide a non-duplication switching arrangement for a CATV system which utilizes conventional business machine cards capable of being computer programmed for non-duplication control of selected channels, and which are used in conjunction with a simple readout device to delete appropriate channels at appropriate times from transmission over the cable to subscribers.

It is a further object of this invention to provide a switching arrangement of the type stated which eliminates the need for a skilled television technician to program the headend for non-duplication protection and which is much less time-consuming to program than present systems.

In accordance with the present invention, a conventional computer is programmed to accept schedules from the local and distant television stations, which are provided to or known by the CATV operator. The CATV operator feeds the schedule to the computer which, in a known manner, compares the programs of the schedules and determines at which times one of more local channels require non-duplication protection. The computer punches standard eighty column, twelve row cards in accordance with this information. Each row of the card corresponds to a television channel, and each of the eighty columns represents a fifteen minute time segment during a 24 broadcasting day, which covers most television stations. Thus, for each distant channel there will be a series of holes along the row corresponding to that distant channel, the holes representing the time periods at which transmission of that distant channel from the headend of the CATV system to the cable of the system is to be prevented. One card covers covers 1 day's broadcasting. The cards are placed individually in carriers which are stacked in a magazine or holder. Each card and carrier is progressively withdrawn from the holder, in a step-by-step manner, moving one step in a 15-minute interval. Thus, it takes 24 hours from the time the carrier begins its withdrawal until it has been fully withdrawn from the holder. As the card and carrier move out of the holder, a photoelectric detector senses the presence of the punched holes in the cards and actuates suitable switching to delete the particular distant channel for that time period. The holder may contain any desired number of carrier-supported cards, for example seven, which represents 1 week's programming.

The attainment of the above and further objects of this invention will be apparent from the following description taken in conjunction with the accompanying drawing forming a part thereof.

Figures 1, 2, 3, 4, 5, 6, 7, 8:
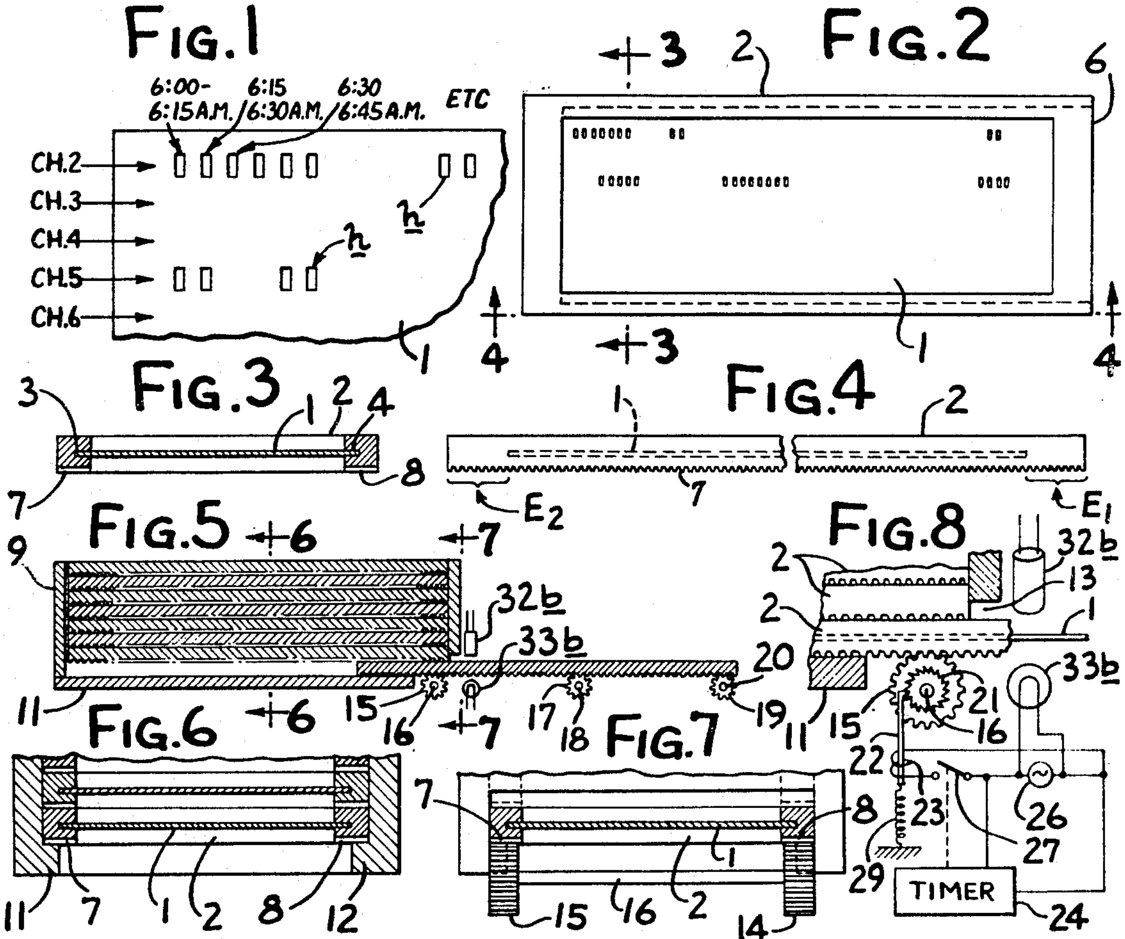
FIG. 1 is a plan view of a fragmentary portion of a programmed card that forms part of the present invention.
FIG. 2 is a plan view of the card in a card carrier.

FIGS. 3 and 4 are fragmentary sectional views taken along lines 3—3 and 4—4, respectively, of FIG. 2;

FIG. 5 is a fragmentary longitudinal sectional view of a card holder and related mechanism that form part of the present invention;

FIGS. 6 and 7 are fragmentary sectional views taken approximately along lines 6—6 and 7—7, respectively, of FIG. 5;

FIG. 8 is an enlarged portion of FIG. 5 but with additional detail shown; and

Figure 9:
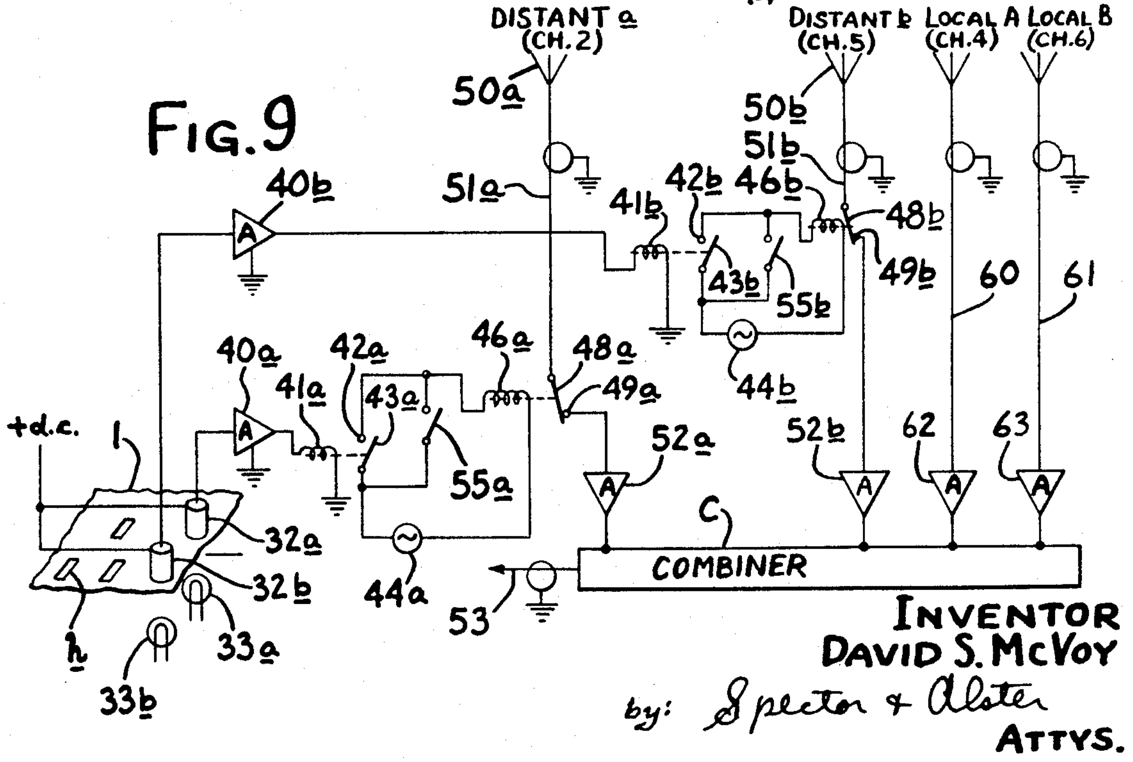

FIG. 9 is a circuit diagram embodying the invention.

Referring now in more detail to the drawing, there is shown a fragmentary portion of a standard rectangular business machine card 1. Such card has twelve rows and eighty columns. By way of example, each row represents a standard VHF television channel (i.e. from channel two to channel 13) and each column represents a particular 15-minute time interval during a programming day. Since the typical television station does not broadcast between 2:00 a.m. and 6:00 a.m., the 80 columns represent a 24-hour broadcasting day. For each broadcasting day, a card 1 is programmed. This may be done by punching the card to provide holes *h* along the channel rows corresponding to the time periods during which the transmission from those channels is to be prevented from being sent over the cable of the CATV system. These time periods are, of course, those during which the same program is being sent over the cable over another channel. Typically, the programmed channels are those distant TV stations that are received by the cable system's antenna and which are on the same network as a local station. For instance, if a network has a distant station, say on channel two and a local station on channel four, the channel four row will not be punched but the row corresponding to channel two will be programmed by punching the card 1 at places corresponding to the time periods at which channels two and four are transmitting the same program. In the example of FIG. 1, channels two and five are shown as being programmed with punch holes *h*.

As previously stated, the cards 1 for each day are punched by the computer in conventional manner. However, in theory at least, the cards (which may be pre-printed with punch hole outlines) could be manually punched.

For each card 1 there is provided a rectangular card frame or carrier 2 having opposed slots 3, 4 for receiving the longitudinal margins of the card 1. One transverse side of the carrier 2 has an opening 6 through which the card 1 is inserted and removed. The opposed longitudinal sides of the carrier 2 are formed with parallel rack teeth 7, 8. Preferably, there are 96 teeth per rack, one tooth corresponding to a 15-minute time interval. The card 1 is disposed within the carrier 2 so that there are eight teeth in each rack extending beyond the respective transverse ends of the card, as indicated by the regions E1, E2 in FIG. 4. These two regions E1, E2 may respectively correspond to the time periods of 4:00 to 6:00 a.m. and 2:00 to 4:00 a.m., while the remaining 80 rack teeth between the regions E1, E2 will correspond to the normal 6:00 a.m. to 2:00 a.m. broadcasting day.

Each card 1 and its associated carrier 2 are loaded into a magazine or holder 9 which is open at the top and is rectangularly sized for receiving the carriers 2. A supply of seven carriers 2 may be loaded into the holder 9. The holder 9 has inwardly turned bottom flanges 11, 12 for supporting the stack of carriers 2. The region of juncture of the front and bottom walls of the holder 9 is cut away to provide an opening 13 through which the carriers 2 may be horizontally withdrawn, one-by-one. The bottom-most carrier 1 initially engages pinions 14, 15 that are mounted on a shaft 16, the pinions 14, 15 projecting into the opening 13. Ultimately, the rack teeth 7, 8 on the carrier, as it is being withdrawn from the holder 9, will engage an additional pair of pinions 17 on shaft 18 and a third pair of pinions 19 on shaft 20, all to provide support for the withdrawing carrier 2. As seen in FIG. 8 (but omitted from FIG. 5 for simplicity of illustration), pinion shaft 16 may have a toothed wheel 21 that is engaged by a pawl 22 operated by a solenoid 23, as indicated in FIG. 8. The solenoid 23 is energized by a conventional timer 24, that is operated from a current source 26, and momentarily closes a switch 27 every 15 minutes to energize the solenoid 23. This actuates the pawl 22 to move the toothed wheel 21 that fraction of a revolution which will advance the carrier 1 to the right an amount equal to the width of a rack tooth, or in other words, an amount corresponding to 15 minutes of programming. After advancing the carrier 2, a return spring 29 returns the pawl 22 to its normal position where the latter remains at rest until the next pulse, 15 minutes later, from the timer 24. A similar and simultaneously operated timer-controlled solenoid-operated pawl and toothed wheel mechanism is provided on the pinion 17 to assure drive of the carrier after it has moved past the pinions 14, 15.

Initially, the carrier 2 may begin its movement out of the holder 9 at 4:00 a.m. From that time until just before 6:00 a.m. the rack section E1 will be driven by the pinions 14, 15. At the pulse from the timer 24 at 6:00 a.m., the first column on the card 1 will have passed through the opening 13 and will appear on the outside of the holder in alignment with photocells 32*a*, 32*b*, etc. and light sources 33*a*, 33*b*, etc. One photocell and light source may be provided for each programmed channel row of the card. For simplicity, in the present case, two rows are shown as being programmed, namely channels two and five.

As the 24-hour broadcasting day proceeds, the carrier 2 and card 1 for that day will be advanced through the opening 13 in a step-by-step manner every 15 minutes. The photocells 32*a* 32*b*, etc. will be energized each time a punch hole *h* in the card 1 appears in registry between the photocell and light source to signal or trigger the cutting off of that channel from transmission to the cable of the system, in a manner presently to be described.

Referring to FIG. 9, there is shown a system for providing non-duplication protection for two local stations A, B against two distant stations *a*, *b* where in a typical situation the A, a stations are one network and the B, *b* stations are on another network. It will be seen that the photocells 32, 33 are supplied from a low voltage d.c. source in a conventional manner. The output signals from the respective photocells may pass through amplifiers 40*a*, 40*b* and used to energize control relays 41*a*, 41*b* to close their respective normally open contacts 42*a*, 43*a*, 42*b*, 43*b*. Closing of the contacts 42*a*, 43*a* results in current from a source 44*a* being supplied to the coil 46*a* of a coaxial relay to open the contacts 48*a*, 49*a* thereof. The antenna 50*a* on the CATV tower for receiving the distant station a (channel two, for example) normally sends its received signal along the coaxial downlead 51*a*, through contacts 48*a*, 49*a*, processing amplifier 52*a*, to conventional band combiner C, and then for distribution with the other channels to the coaxial cable 53 of the CATV system. However, when a punch hole *h* in the channel two row of the card 1 moves into registry with the photocell 32*a* (corresponding to a time when station *a* would be duplicating local A), the photocell 32*a* will conduct, energizing relay 41*a*, closing contacts 42*a*, 43*a* to energize coil 46*a* and open contacts 48*a*, 49*a*. This interrupts the signal from the downlead 51*a* to the combiner C and prevents the signal of the distant *a* channel two from being transmitted over the cable 53 to subscribers during the 15-minute interval during which a hole *h* is under the photocell 32*a*. At the end of the 15-minute interval, the card 1 and its carrier will advance a step, as previously described. If there is another hole *h* present in the channel row, the channel will be deleted for another 15 minutes. Finally, when the card advances a step and no hole is present in the channel row, the photocell 32*a* will be non-conducting and result in relay 41*a* being deenergized, opening contacts 42*a*, 43*a*, deenergizing coil 46*a*, and closing contacts 48*a*, 49*a*. This restores the signal from antenna 50*a* to the cable 53. For non-duplication control contrary to the card programming as, for instance, for last-minute program changes, there is a manual over-ride switch 55*a* to operate the relay coil 46*a*.

For the distant *b* station (channel five, for example) there is an arrangement similar to that just described with respect to station *a* for preventing the signal from station *b* from being transmitted to the cable 53 when station *b* would be duplicating a program of local B. The circuit elements for this purpose are shown in FIG. 9 with like reference characters as described in relation to station *a*, but with the subscript *b*. Local stations A and B, of course, normally do not have the photocell-controlled interruptor coaxial relays in the respective antenna down-leads 60, 61 but feed directly to the processing amplifiers 62, 63.

The precise constructions herein shown are merely illustrative of the principles of the invention.

What is considered new and sought to be secured by Letters Patent is:

1. In a multi-channel cable television system including means for combining predetermined channel frequencies and transmitting those frequencies over a cable, and switching means for interrupting the transmission over said cable of at least one of said frequencies to prevent transmission of identical broadcast material over more than one channel at a time; an improvement comprising a sheet having a region corresponding to said one frequency and said sheet having programming means for said region corresponding to the arrival of predetermined moments of time throughout an ascertained interval of time and indicating selected periods of transmission and interruption for said frequency, detector means for actuating said switching means, and means providing relative movement between said sheet and said detector means during said ascertained time interval in a manner to detect the programming means at said region for selectively actuating the switching means for each frequency to interrupt and transmit said frequency selectively responsive to said predetermined moments of time.

2. In a system according to claim 1, a carrier for said sheet, and means for moving the carrier past said detector means.

3. In a system according to claim 1, said sheet being a card having perforations making up the programming means.

4. In a system according to claim 3, a carrier for said card, a holder containing a stack of said carriers each with a card therein, and means for driving the carriers one-by-one from the holder past the detector means.

5. In a system according to claim 3, said detector means including a light source and a photocell for receiving light from said source that passes through at least one perforation at said predetermined moments of time.

* * * * *

UNITED STATES PATENT OFFICE
CERTIFICATE OF CORRECTION

Patent No. 3,686,573 Dated August 22, 1972

Inventor(s) David S. McVoy

It is certified that error appears in the above-identified patent and that said Letters Patent are hereby corrected as shown below:

Column 1, line 39, "schedule" should read -- schedules --; line 42, "of" should read -- or --. Column 2, line 31, "24-hour" should read -- 20-hour --, Column 3, line 57, "24" should read -- 20-hour --. Column 4, line 2, after "are" insert -- on --.

Signed and sealed this 10th day of April 1973.

(SEAL)
Attest:

EDWARD M.FLETCHER,JR.
Attesting Officer

ROBERT GOTTSCHALK
Commissioner of Patents